United States Patent [19]

Doster et al.

[11] Patent Number: 4,777,781
[45] Date of Patent: Oct. 18, 1988

[54] APPARATUS FOR CREATING HIGH DENSITY TIRE RICKS

[76] Inventors: John Doster; Joe Barnett; Jimmy Barnett, all of Rte. 1, Box 516, Nettleton, Miss. 38858

[21] Appl. No.: 77,884

[22] Filed: Jul. 27, 1987

[51] Int. Cl.$^4$ .................. B65B 25/24; B65B 35/50
[52] U.S. Cl. ........................................ 53/527; 53/523; 53/540; 53/409; 100/100; 100/218; 414/661; 414/907
[58] Field of Search ................ 53/523, 540, 527, 409; 100/100, 218; 414/85, 661, 907

[56] References Cited

U.S. PATENT DOCUMENTS

| | | | |
|---|---|---|---|
| 3,157,301 | 11/1964 | McWilliams | 414/85 |
| 3,381,834 | 5/1968 | Gibson | 414/661 X |
| 3,908,539 | 9/1975 | O'Brien | 53/540 X |
| 4,116,349 | 9/1978 | Durham | 100/100 X |
| 4,249,843 | 2/1981 | Kerr | 414/85 X |

Primary Examiner—John Sipos
Attorney, Agent, or Firm—Alexander F. Norcross

[57] ABSTRACT

An apparatus for increasing the volumetric efficiency of a shipping container of standard tire carcasses is shown as a powered attachment to a standard warehouse tug or forklift. A horizontally extending steel plate, extending forward from the front of the tug, is powered for vertical motion by a double action, two stage hydraulic cylinder. The plate is enclosed by tightly fitting sliding stripper bars, which are spring-loaded into both the top and bottom surface of the plate; the stripper bars have a bronze wiper bushing at the point of contact with the plate, and are powered for wiping motion across the plate by a pair of balanced hydraulic cylinders.

A vertical set of powered outriggers is installed on vertically acting hydraulic cylinders to provide a reacting force against the roof or side wall corners of a shipping container.

In use, a standard, interleaved rick of tires is installed in a normal manner within a container. The plate, in a raised position, is then used to compress the tires, creating additional vertical space above the rick. Additional tires are then ricked upon top of the plate, refilling the space within the container. The vertical outriggers are then retracted, the brakes and gear on the warehouse tug are released and the stripper bar plate is then activated, pushing against the tire rick and forcing the tug in a backward direction withdrawing the plate from between the tires. The combination of spring-loaded plates and bronze wipers prevents the tires from being dragged out with the plate, or being extruded from within the rick.

The process is then repeated until the container has been filled with tires.

2 Claims, 5 Drawing Sheets

APPARATUS FOR CREATING HIGH DENSITY TIRE RICKS

BACKGROUND OF THE INVENTION

This invention relates to the packing and shipping, in economical form, of automotive and vehicular pneumatic tire carcasses after manufacture.

It is well known that pneumatic tire carcasses, especially those for tubeless type tires, are created in the form of a stiffened rubber annular having a circular shape with a central hole. The reinforced composite construction of such tire carcasses, creates them in their ultimate inflated shape, even though most of the space contained within the tire is empty air space. The tires are flexible, within limit, but cannot be excessively deformed, crimped or bent without suffering irreversible damage to the internal cord structure, producing carcass weakening and premature failure.

The typical form of shipment of such tires is in the form of a rick, created by stacking alternate rows of tires within a shipping container; each row of tires is placed at a substantially acute angle; successive rows are placed at alternating angles, creating an interleaved and interlocking effect. Such a rick appears from the side as a very large herringbone pattern.

The generally high friction between adjacent tires together with the interlocking effect provided by this herringbone rick construction tends to restrain the tires from shifting, even though the overall density of a tire shipment is quite low because of the enclosed air space. Although the herringbone rick has been determined, through experimentation, to be the most efficent method of packing tires within a rectangular container for shipment, it is a low density packing, and shipment charges remain a considerable portion of the logistics of manufacturing and distributing tires.

Since the shipment of automobile tires within the United States is principally by truck borne trailer, volumetric limits, and not weight are the principal constraint on tire shipment costs and a principal economic contributor to the overall cost of manufacture and sale of tires.

SUMMARY OF THE INVENTION

The current invention is a powered apparatus for installation on a standard fork lift or warehouse tug which serves to permit the loading of tires in the form of a standard tire rick and then compress the rick to a volume down to one-half of that ordinarily required, permitting the installation of proportionally as many additional vehicular tire carcasses within a closed volumetric space, as would be possible without the invention. The resulting increase in volumetric efficiency creates a significant cost saving in the overall shipment costs of completed tire carcasses, and in turn represents a significant saving in the overall economic cost of a vehicular tire.

The apparatus, in essence, consists of a flat plate or compression wedge horizontally mounted and adapted for powered vertical movement on the front end of a standard forklift or lift truck. In one embodiment the "wedge" has a single vertical double acting, two stage cylinder for raising it to its maximum height or for imparting a compressive downward force to the wedge. A pair of balanced compression cylinders reacting between the wedge and an overhead outrigger assembly provide an additional resisting force against upward reaction on the lift truck by reacting against the upper side walls and roof of an enclosing container within which the apparatus operates. The overall size of the wedge is designed to match the width of a standard shipping container, and to be of a depth sufficient to completely cover the top of an integral number of rows of tires stacked in a rick arrangement as previously disclosed. Slidably enclosing the wedge and with independent hydraulic activators to permit motion with respect to the wedge is a stripper bar assembly, having two parallel push bars extending horizontally the width of the wedge, and between which the wedge slides. The individual push bars are spring loaded so as to produce a smooth scraping motion against the top and bottom surface of the wedge as the wedge is drawn through the stripper bar assembly.

Folding ladders are provided to permit a worker to easily climb upon to the top surface of the wedge or, lifting the ladder out of the way to readily walk under the wedge.

In use, the wedge is raised to its full height, the lift truck positioned so that the wedge is against the roof of the container, its forward edge against the back wall of the container or against the previous rick of tires installed within a container. The vertical reaction outrigger may be expanded to fit within the container, with crossbar members extended out to the joints between the roof of the container and the side walls. A tire rick is laid under the wedge, filling the entire space between the floor of the container and the bottom surface of the wedge; such a rick represents the normal capacity for tires of the container for the techniques now current in the art.

An operator then lowers the wedge, by hydraulic action. The resulting downward force is augmented by the weight of the lift truck and, optionally, against the reactive force of the outrigger assemblies pressing against the container. It has been found that a compression of up to fifty percent in vertical height can be imposed on some ricks of tires without seriously deforming or damaging the tires or causing them to take a permanent set.

The wedge is then held in the down, compression position, the ladder is lowered and a second half rick of tires is installed between the upper surface of the wedge and the roof of the container. This will generally permit up to fifty percent more tires to be installed within the same vertical space. After the second, upper rick has been installed, the wedge is then withdrawn from between the upper and lower ricks of tires by releasing the brake and gears of the lift truck, lowering the outriggers, and then extending the stripper bar, pushing against the rick, and causing the wedge to be drawn through the stripper bars.

The known high friction of tire carcasses coupled with the compressive effect of the wedge upon the lower rick of carcasses would normally draw out, tear or extrude the tire carcasses into the lift bar as the wedge is removed, or may well prevent the wedge from being removed from the tire rick at all without causing the collapse of the rick. The stripper bar, however, presents a smooth pushing force to the two layers, upper and lower, of tires in direct contact with the Wedge. The spring-loading of the stripper bars prevents the stripper bars from being driven apart by the tires, which are, as a rubberized material, quite ductal, and prevents tires from being ripped and drawn into the space between the stripper bars and the wedge. It is this combination of spring-loaded stripper bar that permits the wedge to be successfully and fully withdrawn from between the ricks of tires.

The interlocking of the tires within the rick and the very high friction levels within the tires prevent any rapid motion or redistribution of stress between the lower, compressed rick and the upper, manually installed rick. It is observed that over time the stresses of the tires will redistribute producing some compression of the upper rick of tires. Nonetheless the upper rick will remain sufficiently non-compressed that the tires at the top of the rick can be readily removed by hand thus permitting the more denser pack to still be easily be unpacked at the destination.

The end result is that the use of the apparatus as disclosed permits tires to be compressed to the extent that a significant increase in volumetric efficiency of loading of containers can be obtained, yet it does so without damage to the tires, and without significant effort on the part of the tire loaders.

It is thus an object of this invention to provide an apparatus which permits the successful compression of tire carcasses within a standard container so as to admit to a greater number of tires within a given volume.

It is a further object of this invention to show a method of increasing the volumetric efficiency of packing tire carcasses within an enclosed space for shipment, without requiring special apparatus or techniques for unloading the tires at the destination.

It is a further object of this invention to show an apparatus which is capable of compressing a rick of tires for a greater volumetric efficiency, without entrapping the apparatus within the compressed rick of tires and without damaging the tires upon withdrawal of the apparatus, while the tires are in a compressed state.

These and other objects of the invention will be more readily apparent from the detailed description of the preferred embodiment which follows.

DETAILED DESCRIPTION OF THE PREFERRED EMBODIMENT

Figure 1:
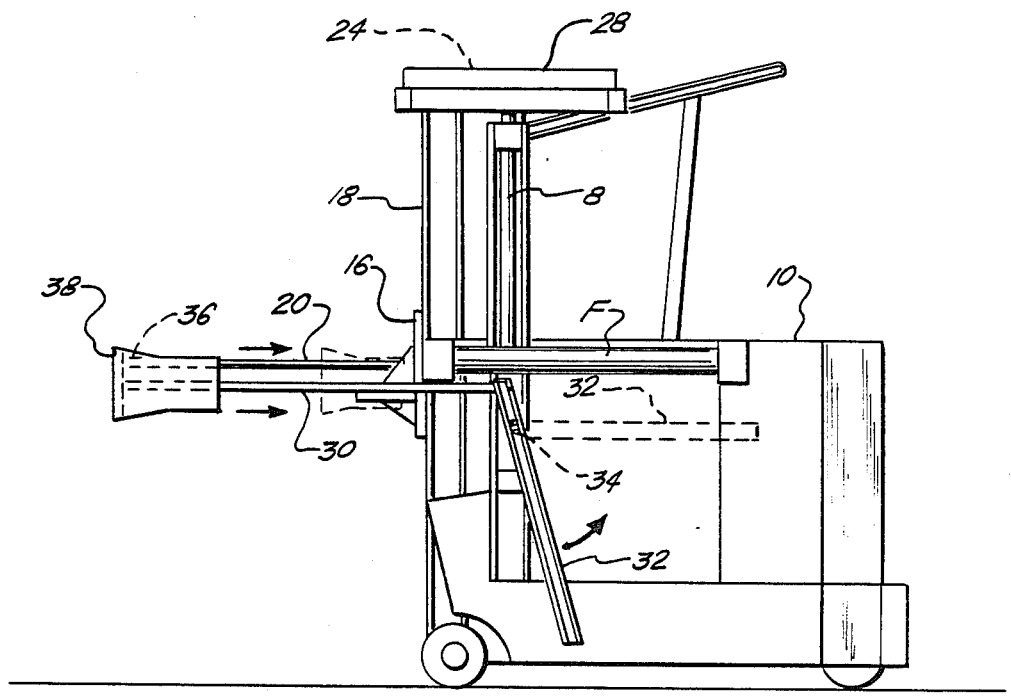
FIG. 1 is a side view of the invention as installed upon a typical lift truck showing the inner operative movement of the stripper bar assembly.
Figure 2:
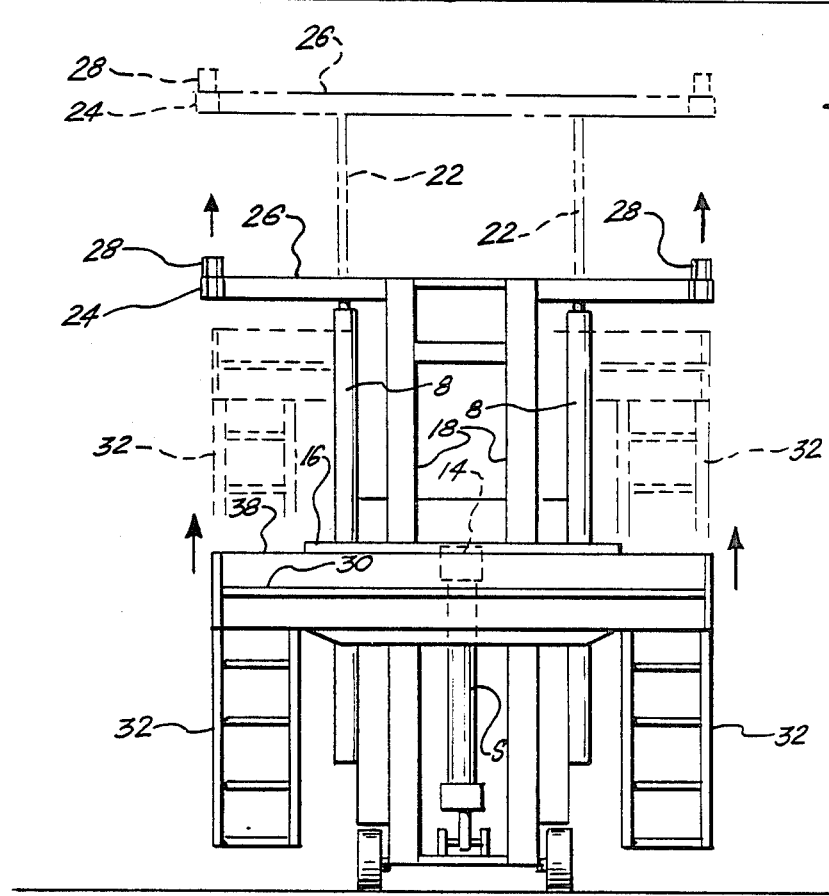
FIG. 2 is a front view of the invention as installed upon a standard lift truck, depicting the vertical motion of the entire apparatus for positioning.

Referring to FIGS. 1 and 2, the general arrangement of the apparatus may be seen installed upon a prime mover 10 such as a tug, lift truck, forklift body or the like. One embodiment has been installed on a Tow-Motor TM warehouse tug. The vertical positioning of the apparatus of the invention is by means of a master main lift cylinder 5, a double action, two stage hydraulic cylinder mounted at a lower reacting end 12 to the frame of the prime mover 10. An upper reacting end 14 of main lift cylinder 5 is fixedly connected to wedge support beam member 16. Wedge support beam member 16 is an essentially horizontal beam and plate structure, affixed for receiving vertical movement forces from cylinder upper reacting end 14 and slidably supported through interlocking sliding engagement with two parallel vertical support I-beams 18. The use of parallel vertical I-beams 18 to maintain alignment of wedge support member 16 is well understood in the art, and is common to all such vertically moving attachments for forklifts and the like; it is not further described here. The interconnecting relationship of vertical support I-beams 18, wedge support beams 16 slidably affixed thereto, and main lift cylinder 5 is such as to permit wedge support 16 to support both upward or downward loads against significant twisting and overturning forces.

Fixedly engaged to wedge support beam 16 are parallel stripper bar double acting hydraulic cylinders 7, of which there are two, mounted respectively on the left and right outboard of tug 10 and adapted to extend in a direction forward of tug 10. Operatively extending from stripper bar hydraulic cylinder 7 are two stripper bar actuator rods 20.

On tug 10 are fixedly mounted vertical overhead frames double acting hydraulic cylinders 8. Two, left and right, cylinders 8 extend upward from tug 10, and are mounted immediately outboard of vertical support I-beams 18. Each overhead frame cylinder 8 has operatively extending therefrom overhead frame actuator rod 22, adapted for twoway vertical extension, for movement of overhead frame assembly 24.

Overhead frame assembly 24 in turn consists of transverse overhead support beam 26, extending laterally, transverse to the forward direction of tug 10, and fixedly connected to the upper ends of overhead frame actuator rods 22, in a manner which supports support beam 26 in a substantially horizontal position, as overhead frame cylinders 8 are actuated, extending or retracting actuator rods 22.

Transversely mounted on support beam 26 are crossbar members 28. In the preferred embodiment of the invention crossbar members 28 are made of wood, and are mounted upon sliding tubes, slidably affixed within support beam 26 so as to permit relative lateral positioning of each of crossbar members 28 with respect to the centerline of tug 10, and so as to permit varying the width or distance apart of the two crossbar members 28. The method of so mounting such crossbar members for telescopic sliding within an encompassing beam is well understood in the art and not shown in the drawings for clarity.

Fixedly mounted to wedge support beam member 16 and extending horizontally therefrom in a direction in front of tug 10 is wedge 30. In the preferred embodiment of the invention wedge 30 is a generally smooth, polished steel plate having a width substantially equal to that of a standard shipping container and a depth, or length extending in front of tug 10 substantially equivalent to an integral multiple of tire widths of the size of tire to be compressed for shipment by the apparatus in the invention. In the preferred embodiment of the invention, wedge 30 is affixed to wedge support member 16 by an overlapping lip and strongly bolted thereto so as to insure an adequate strength against bending, and to maintain a horizontal position under vertical loads.

Extending from the left and right rear edges of wedge support beam 16, immediately outboard of tug 10 and stripper bar cylinder 7, are folding left and right ladders 32, which are pivotally affixed at ladder upper ends 34 to wedge support beam 16 in a manner which permits ladders 32 to be lowered to a position adapted for climbing or raised to an essentially horizontal position permitting free access to the underside of wedge 30. Ladders 32 are otherwise of standard industrial construction.

Figure 5:
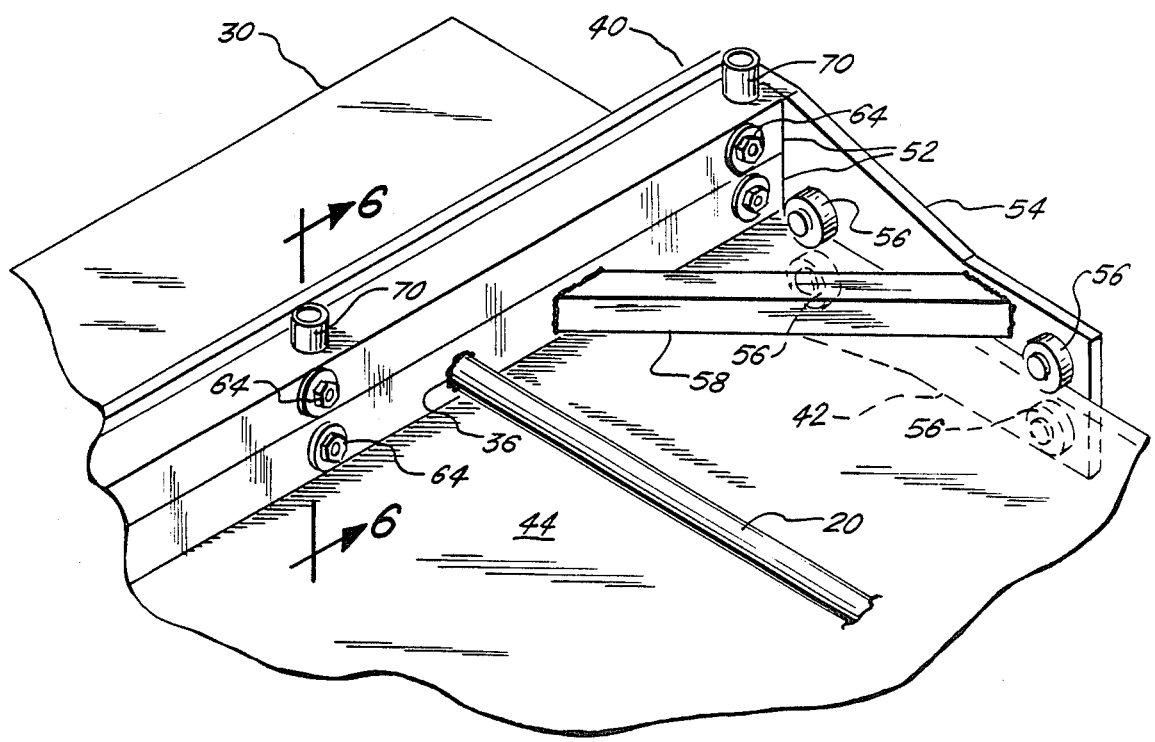
FIG. 5 is a detailed sectional view of one corner of the stripper bar assembly, in engaging relationship with the wedge.
Figure 6:
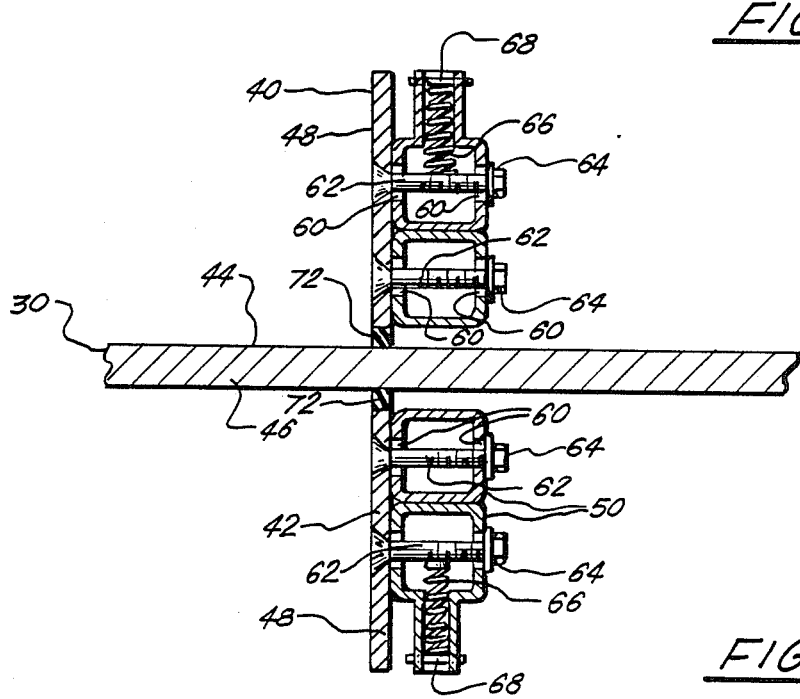
FIG. 6 is a section through the stripper assembly in engaging relationship with the wedge.
Figure 7:
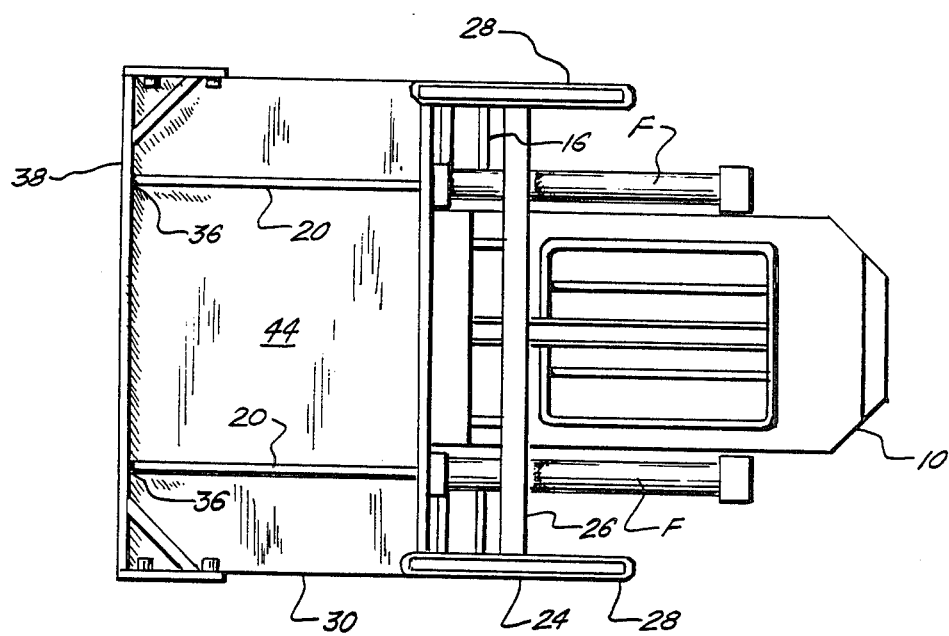
FIG. 7 is a vertical view downward upon the top of the apparatus in the invention as installed upon a standard lift truck after the stripper bar has been extended.
Figure 8:
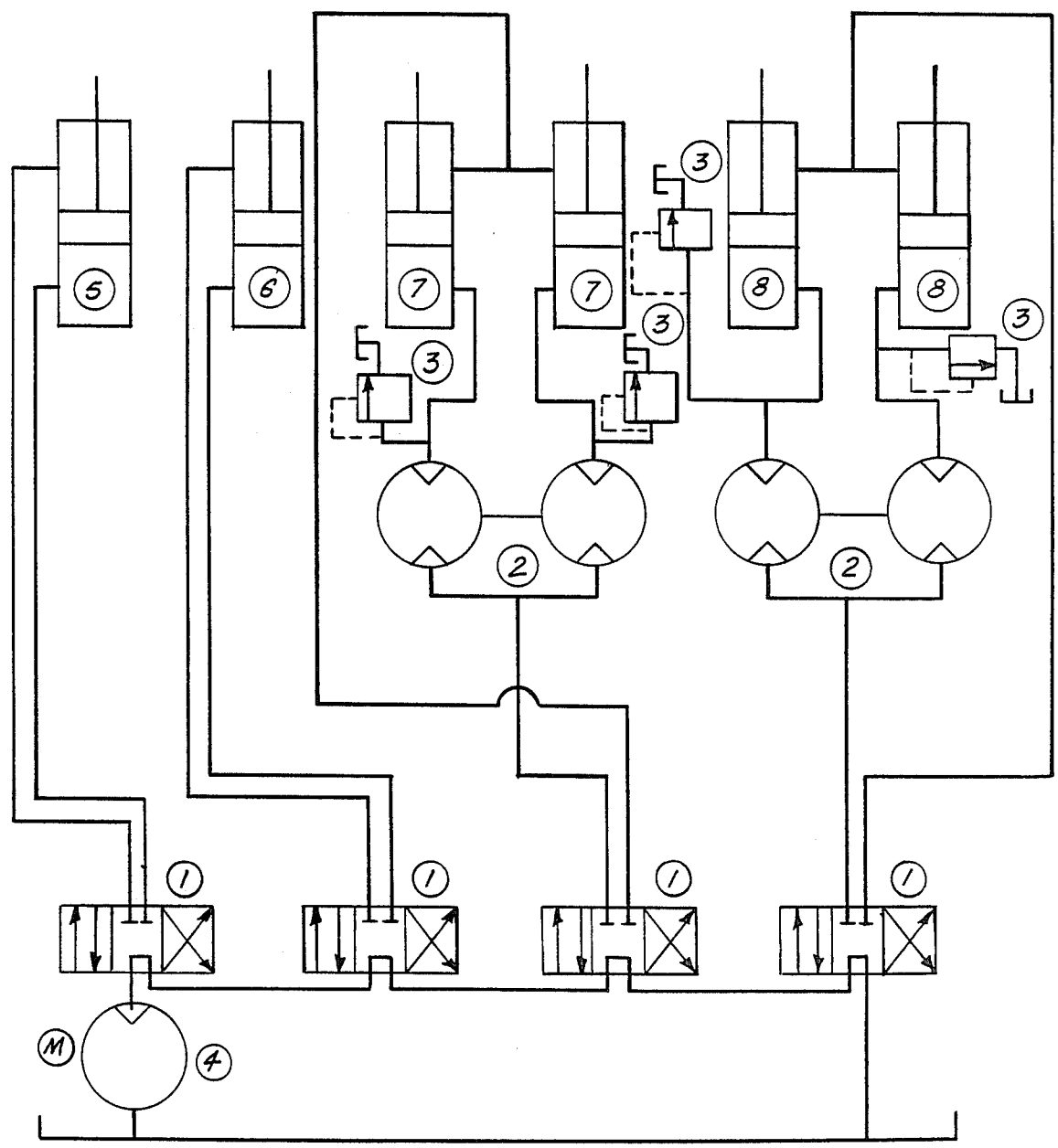
FIG. 8 is a diagram of the hydraulic controls of a preferred embodiment of the invention.

Affixed to the far, operating end 36 of stripper bar actuating rod 20 is stripper bar assembly 38. Referring to FIG. 5, and FIG. 6, stripper bar 38 is seen to comprise symmetrical upper bar member 40 and lower bar member 42, which are essentially symmetrically disposed against the upper surface 44 and lower surface 46 of wedge 30.

Taking upper bar member 40 as typical, lower bar member 42 being symmetrically constructed and oppositely disposed thereto, upper bar member 40 is seen to comprise, in combination, stripper push plate 48, a substantially vertically aligned flat steel plate extending horizontally beyond the width of wedge 30. Each of the upper and lower stripper push plates 48 are mounted to and supported by stripper bar 38, by means of parallel adjoined bar support tubes 50, which are welded together to form a substantially strong cross member extending the width of wedge 60; upper bar support tubes 50 are in turn operably connected to the operating end 36 of each stripper bar actuator rod 20, receiving and transmitting the entire force thereof.

In turn, bar support 50 for upper bar members 40 and bar support members 50' for lower bar member interconnected, to form a single, solid, strong member, at bar support ends 52 by being welded to stripper bar end support plate 54. Although one plate 54 is shown, it is understood that two plates 54 are provided, one at each end of bar support members 50'. Bar support plate 54 is an essentially elongate plate extending vertically both above and below wedge 30 and provided with adjoining wedge rollers 56 to maintain bar support plates 50, 50' in straight alignment with wedge 30. A corner brace 58 is provided extending and welded between an area near one end of support plate 54 and an area near bar support end 52 to strengthen the attachment of support plate 54 and bar support members 50'.

Referring to FIG. 6 it will be seen that each of bar supports 50, 50' are provided with vertical sleeve openings 60 within which are push plate support bolts 62. Each of push plate support bolts 62 are countersunk and affixed by welding to push plate 48; bolts 62 are secured within bar supports 50 by means of matching nuts and washers 64. In practice nuts 64 are tightened to within a one-half turn of full tightness, permitting lateral vertical movement of bolts 62, and thus push plate 48, with respect to bar supports 50. Within bar supports 50, each pair of push plate support bolts 62 are mounted against bias springs 66, secured in a compressed position by spring-lock members 68. Each of springs 66 are compressed to provide a substantially strong biasing force, which reacting between bolts 62 and bar supports 50, 50', clamps plates 48 against upper surface 44 and lower surface 46 of wedge 30. In order to support springs 66 in a columnar form under this compression, springs 66 extend for a distance within spring support cylinders 70, mounted in and extending outwardly from bar supports 50.

Fixedly mounted on an edge of stripper push plate 48, on the edge contacting the surfaces of wedge 30, are oil impregnated brass bearing strips 72; strips 72 are affixed to the edges of plate 48 by screws or by any other suitable method, and provide a wiping bearing surface between stripper bar plates 48 and wedge 30.

Figure 3:
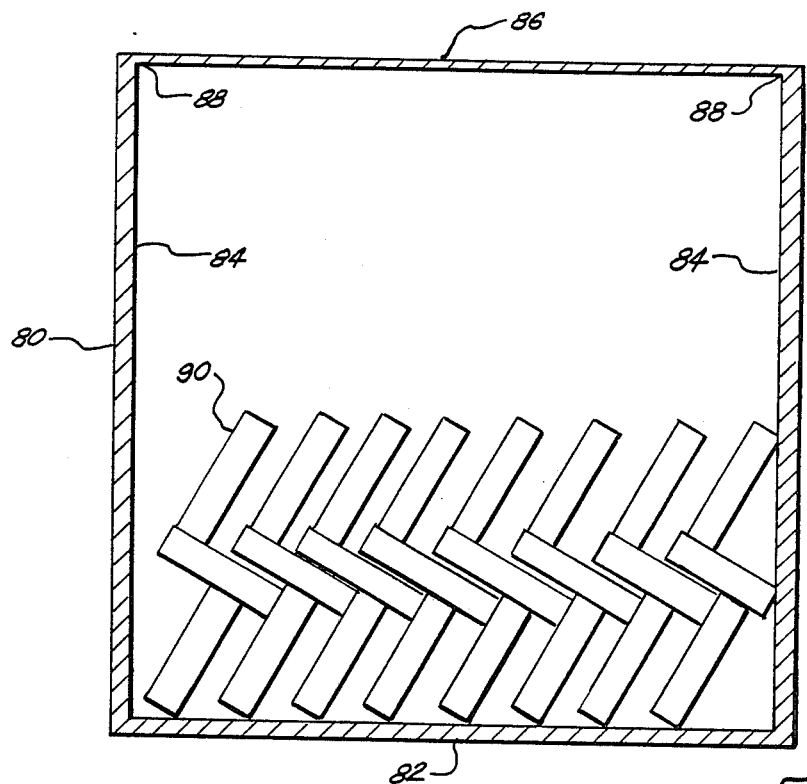
FIG. 3 is a depiction, exaggerated for clarity, of a typical rick of tires.
Figure 4:
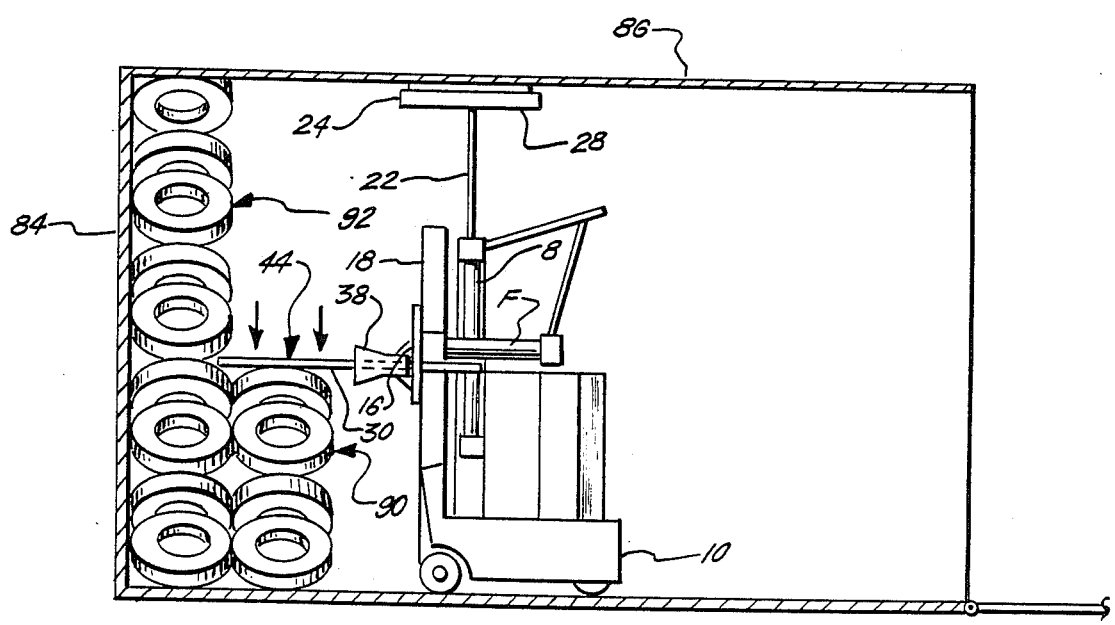
FIG. 4 is depiction of a rick of tires being compressed for loading by the apparatus of the invention.

In use the invention is used in conjunction with the standard stacking and shipment of tires within a container. FIG. 3 and FIG. 4 show a typical shipping container 80 containing therein alternating rick of tires 90. Tire rick 90 is created by stacking alternating layers of tires at angles with respect to each other so that the tires essentially interlock, the outer rim of one layer of tires tending to fall to within the central hole of that layer of tires immediately beneath, the central hole of a layer of tires tending to engage the outer rims of the layers of tires immediately beneath, the pattern repeating in a herringbone effect. The distance and angle between tires in FIG. 3 is exaggerated to show this herringbone effect. In practice, the individual tires would be closely abutted one to another with no substantial intervening space and the tires would be canted about 15° to horizontal. A more vertical or greater angle would induce bead damage. This method of stacking tires has proven in practice to be the most satisfactory and provides the highest density stacking achievable within a fixed container.

Container 80 in turn, whether it be a standard internodal container or a standard truck trailer, is an essentially rectangular box having a base 82, substantially strong side walls 84 and a roof member 86. The base 82 provides not only the load carrying capacity for the contents of the trailer, but is also the principal support and structural member for the container 80 itself, and is quite strong; for similar reasons the side walls 84 are usually of a strength equivalent to that of base 82. In internodal containers, the vertical bearing loads of stacking containers one upon the other is transmitted through the side walls and they are reinforced for this purpose. The roof 86, however, is essentially a weather protecting surface and save for providing adequate strength to avoid tin canning, and in an internodal container some resistance to breaching as internodal containers are stacked, is generally of a weaker construction than side walls 84. However, the lines along which roof 86 and side walls 84 join at corners 88 are substantially strong for the entire length of the container.

In use, therefore, the invention, rolled by tug 10 is inserted within a container against a back wall 89 or already installed rick 92.

Overhead frame cylinders 8 are then actuated, to raise overhead frame 24 to within contacting relationship with container roof 86. Crossbar members 28, which act as outriggers in this case, are then extended so that each of crossbar members 28 will fit contactingly within corners 88 of the roof. Pressure is then placed upon overhead frame cylinders 8 to lock overhead frame 24 in position.

Main lift cylinder 5 is then actuated utilizing control 1, raising wedge 30 to within contacting distance of the roof. Ladders 32 are raised out of the way of workers, and a standard interleaved herringbone rick of tires 90 is then manually installed underneath wedge 30, filling the vertical space from floor 82 to adjacent roof 86, contacting the underside of wedge 30.

Personnel are then withdrawn and lift cylinder 5 is actuated in a counter-direction using control 1, lowering wedge 30, compressing rick 90 of tires. The reaction force of this compression is transmitted through wedge support member 16 and lift cylinder 5 to the frame of tug 10 and also through overhead frame cylinder 8, and actuator 22 to overhead frame 24 and thence into roof 86, or as required by the strength of the container, the corners 88.

In practice it is found that wedge 30 may be successfully lowered so as to compress rick 90 up to half its typical height without causing excessive stresses upon container 80, and without imposing damaging deformation or creating a permanent set in the tires within rick 90. Thirteen inch bias tires can be compressed fifty percent, and fourteen or fifteen inch bias tires typically compress one-third.

At this point, ladders 32 are lowered and a second smaller rick 90 is manually installed upon the upper surface of wedge 30, treating it as though it were the floor 82 of a smaller container. This rick, as should be apparent to those skilled in the art, will contain proportionately as many tires as original rick 90 is compressed.

After the second, smaller rick is installed upon the upper surface of wedge 30, overhead cylinders 8 are released, personnel withdraw lowering frame 28. The brake and gear of tug 10 are released and stripper bar cylinders 7 are activated in coordination, forcing stripper bar 38 against tire rick 90, forcing tug 10 backward, withdrawing wedge 30 from within the fully installed rick of tires, while maintaining pressure through push plates 48 against the rick of tires. The wiping action of the oil brass bushing plates 72, compressed against upper surface 44 and lower surface 46 of wedge 30 by the force of the bias springs 66, prevents the extrusion or pulling of tires or tire material along wedge 30, as wedge 30 and tug 10 mutually withdraw.

When wedge 30 is fully withdrawn, stripper bar 38 is then retracted and the process repeated. power to the parallel hydraulic cylinders is by fluid through unitized hydraulic control 1 and is divided by hydraulic flow dividers 2 to insure that the actuation of stripper bar 38 by parallel stripper bar cylinder 7 and also the vertical resistance during compression by overhead frame cylinders 8 are balanced, preventing canting and jamming either of the stripper bar 38 upon wedge 30 or of the tug 10 within container 80 during compression of the rick. Likewise, hydraulic fuses 3 of standard design are installed within the hydraulic fluid lines to stripper bar cylinders 7 and overhead frame cylinders 8 so as to prevent a dangerous hydraulic pressure overload condition should too much compression be imposed or should there be excessive jamming. Should wedge 30 become jammed within a rick, it is found that a slight raising and lowering of wedge 30 through activation of lift cylinder 5 is usually sufficient to free it enough to permit it to be withdrawn through stripper bar 38.

It is found in practice that the interlocking of the various tires within a compressed rick produced by the apparatus of the invention is such that the tires do not rebound to a uniform pressure throughout but that the upper row of tires, adjacent roof 86, remains substantially loose and easily removable. Thus a load of tires installed by the apparatus of the invention still may be unpacked by typical manual means.

It should thus be apparent from this description of the preferred embodiment that the invention is not restricted to the specific embodiment herein described but rather to those variations in the structure as will be obvious to those skilled in the art.

I claim:
1. An apparatus for increasing the storage density of an interleaved rick of tires comprising:
   A. motive power means for positioning and powering the apparatus;
   B. a substantially flat, horizontal plate, having a top and a bottom surface, being fixedly supported, and adapted for vertical motion with respect to the said power means;
   C. means upon the said power means for resisting vertical movement thereof upon the application of a load against the said bottom surface of the said plate means;
   D. first top horizontal and second bottom horizontal stripper bars, slidably encompassing said plate means, affixed to said power means, having means for relative inward and outward motion with respect to said power along said plate means; and
   E. means within said stripper bar means for compressibly engaging said stripper bar means against said top and said bottom surface of said plate.

2. An apparatus for compressing a rick of tire carcasses for increased volumetric storage comprising:
   A. a powered tug providing a source of hydraulic power and a means of positioning said apparatus;
   B. at least one vertically acting hydraulic cylinder, vertically mounted upon a front of said tug; structured for moving a structure vertically with respect to the front of said tug;
   C. a horizontal plate rigidly interconnected to said vertical hydraulic cylinder, said plate moving vertically upward upon motion of said cylinder, said plate being structurally maintained in a substantially horizontal position throughout said motion;
   D. second, vertical hydraulic cylinder means being affixed at a first, operating end to said tug; vertically extending and affixed at a second operating end to means for imparting a reactive force to an overhead structure;
   E. a first horizontal bar extending the width of said plate in sliding engagement to a first surface of said plate;
   F. a second horizontal bar extending the width of said plate in sliding contact with a second surface of said plate;
   G. said first and said second bars being rigidly interconnected for joint movement;
   H. means for cooperatively forcing said first and said second horizontal bars together in clasping, sliding relationship to said plate;
   I. a third hydraulic cylinder means having a first operating end mounted upon said tug;
   J. said third cylinder means having a second operating end connected to one of said horizontal bars;
   K. such that said horizontal bars may be forcibly positioned relative to said plate, imparting a reactive motion to said tug.

* * * * *